United States Patent Office 2,709,741
Patented May 31, 1955

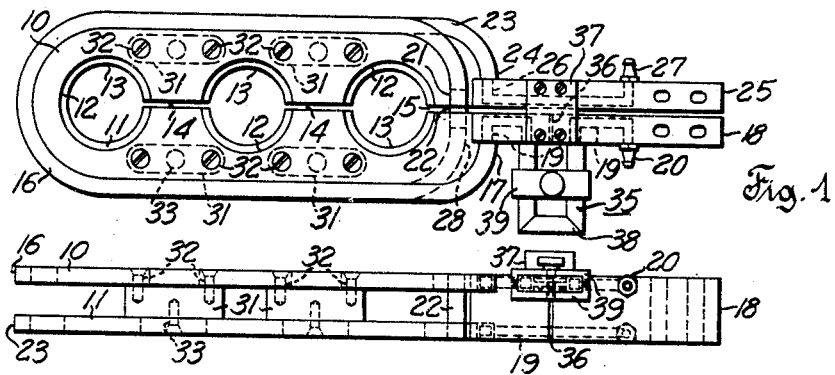
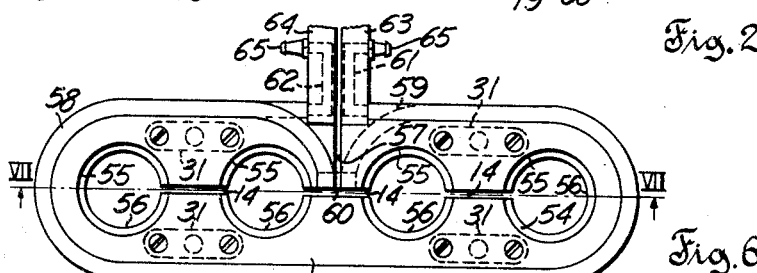
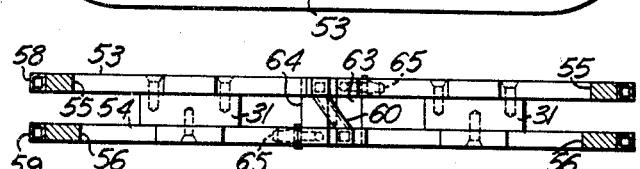
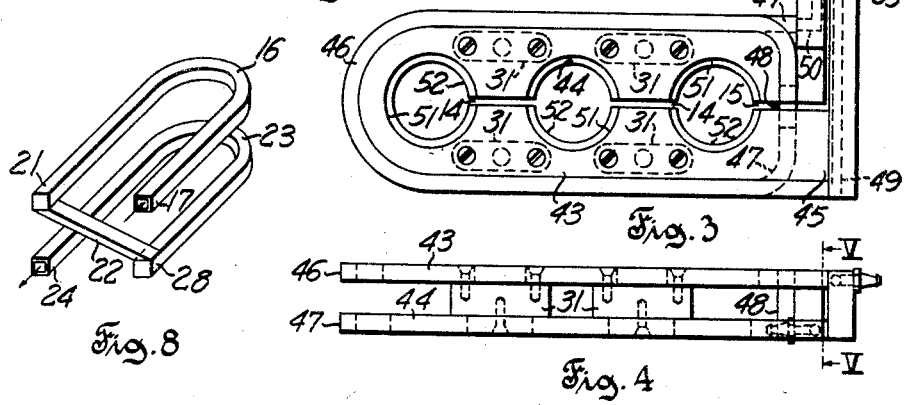
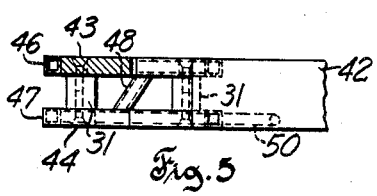

2,709,741

INDUCTOR COIL COMPRISING PARALLEL PLATES CONNECTED BY A COOLING CONDUIT

William B. Albrecht, Wauwatosa, Wis., assignor to Allis-Chalmers Manufacturing Company, Milwaukee, Wis.

Application April 17, 1952, Serial No. 282,827

5 Claims. (Cl. 219—10.79)

This invention relates to improvements in inductors for heating a workpiece by high frequency induction and particularly to the improved construction and arrangement of a multiple turn inductor.

It is an object of the present invention to provide an improved multiple turn inductor comprising parallel plates each having a plurality of work receiving apertures therein.

Another object of the present invention is to provide a multiple turn inductor with a single means electrically and hydraulically connecting in series the liquid cooled plates forming the turns of the inductor.

Other objects and advantages of the invention will be apparent from the following description when read in connection with the accompanying drawing, in which:

Fig. 1 is a plan view of a straight inductor embodying the invention;

Fig. 2 is a view in elevation of the inductor shown in Fig. 1;

Fig. 3 is a plan view of an L-shaped embodiment of the invention;

Fig. 4 is a view in elevation of the inductor shown in Fig. 3;

Fig. 5 is a view in cross section of a portion of the inductor shown in Fig. 4 taken along the line V—V;

Fig. 6 is a plan view of a T-shaped embodiment of the invention;

Fig. 7 is a sectional view of the inductor taken along line VII—VII of Fig. 6;

Fig. 8 schematically shows the series connection between cooling conduits for the plates of inductors embodying the invention.

Referring to the drawing, Fig. 1 shows a preferred form of inductor which embodies this invention. The inductor comprises a plurality of superposed metal plates such as the two copper plates 10 and 11 shown, each forming a single conductor turn of the two turn inductor, but more than two plates may also be used. Plate 10 has a plurality of work receiving apertures 12. Adjacent apertures are joined by a cut forming slots or gaps 14 in the plate. The plate has a cut or slot 15 which extends from the periphery of the plate to an adjacent aperture. Slots 14 and 15 and apertures 12 divide the plate into parallel conductor arms which are joined by the unslotted end portion of the plate.

Plate 10 also includes a conduit which is preferably a square copper tube 16 suitably secured as by silver brazing to the outer periphery of the plates or at any other suitable location. The tube 16 may extend away from the plate to form a lead terminal therefor, or as shown, the tube end 17 is suitably connected as by soldering to a bus bar 18 which is suitably secured as by soldering to the plate 10 on one side of slot 15. Bus bar 18 has a duct 19 therein which connects with the opening in end 17 of tube 16. An adapter 20 mounted in the side of the bus bar 18 connects with the duct 19 and provides means for connecting duct 19 and tube 16 to a source of cooling fluid (not shown). The other end 21 of tube 16 terminates on the other side of slot 15 and is suitably connected as by soldering to another conduit such as a piece of tubing 22.

Plates 10 and 11 may be made identical in size and shape, and those shown are thus identical when one plate is viewed inverted with respect to the other, except for the size of their apertures 12, 13. Plate 11, like plate 10, also includes a square copper tube 23 similarly secured to the outer periphery thereof, which may extend away from the plate to form a lead terminal, or as shown, have its end 24 connected to a bus bar 25 which is secured to plate 11 on the other side of slot 15. Bus bar 25 has a duct 26 therein which connects with the opening in end 24 of tube 23 and has an adapter 27 connected to the duct 26 for connection to a drain. The other end 28 of tube 23 is suitably connected as by soldering to the piece of tubing 22. The piece of tubing 22 is, therefore, the only means of hydraulically connecting tubes 17 and 23 together so that cooling fluid forced therethrough has a series path through the cooling circuit between adapters 20 and 27. Fig. 8 schematically shows the arrangement and connection between the cooling conduits of the parallel plates. Reference characters correspond to those used in Figs. 1 and 2.

The piece of tubing 22, besides being the only hydraulic connection between the cooling conduits of plates 10 and 11, is also the only electrical connection between the conductor turns formed by plates 10 and 11.

As so far described, plates 10 and 11 are similar. Plate 11 has apertures 13 which may be the same size and shape as apertures 12 of plate 10. As shown, however, apertures 13 have a smaller diameter, and the row of apertures 13 is aligned with the row of apertures 12, so the corresponding apertures are axially aligned. The particular size and shape of apertures of either plate are dependent on the size and shape of the work piece to be inserted therein to assure the proper spacing of the work from the wall of the apertures and to effect the desired heating of a portion of the work piece.

The plates 10 and 11 are rigidly held apart by blocks 31 made of a suitable electrically nonconductive material such as laminated synthetic resin. Screws 32 secure the blocks to plate 10, and screws 33 secure the blocks to plate 11, thus holding the plates properly aligned and spaced. The bus bars 18 and 25 may provide, if desired, the only support for the inductor.

Means for varying the impedance of the inductor with respect to its source of high frequency current (not shown), comprises a so-called "trombone" which is a loop 35 adjustable in size and connected in series with the inductor. Bus bar 18 is interrupted by a cut 36 between the ends of the loop and the exposed ends of duct 19 are suitably sealed as by solder. The cut 36 is bridged by a block 37 of electrically nonconductive material for maintaining the bar 18 rigid. Block 37 bridges not only cut 36 but also both bus bars to rigidly support bar 18. A U-shaped copper tube 38 soldered to the bar 18 with its ends opening in duct 19 hydraulically and electrically bridges the cut 36. A pair of copper bars 39 are slidably disposed on opposite sides of the U-tube and are removably bolted together to clamp the legs of the U-tube at any position between the bar 18 and the turn of the loop. Bars 39 thus electrically shunt any desired portion of the tube 38 to vary the impedance of the two turn inductor.

Figs. 3, 4 and 5 show another multiturn inductor similar to that illustrated in Figs. 1 and 2. However, the inductor of Figs. 3, 4 and 5 has terminal leads or bus bars 41, 42 secured at right angles to the length of the plates 43, 44 to form an L-shaped structure therewith. Plates 43, 44 are not identical in size since it is necessary that an arm portion 45 of plate 43 be extended for connection to bus bar 41. Each of the plates 43, 44 forms a single conductor turn of the inductor and these turns are connected electrically in series by a series connected cooling conduit in the same manner as are the plates 10 and 11 of the inductor illustrated in Fig. 1. This cooling conduit comprises rectangular copper tubes 46, 47 secured to the outer periphery of plates 43, 44, respectively. One end of each tube is secured to a piece of tube 48 which serves as the only means connecting the plates hydraulically and electrically in series. The other ends of tubes 46, 47 are secured to bus bars 41, 42, respectively, and connect with ducts 49, 50 therein. Means such as adapters 65 connected with the ducts are mounted in the bus bars to provide connection to a source of cooling fluid (not shown) and to a drain. The plates have suitable axially aligned work receiving apertures 51, 52, and spacing blocks 31 which rigidly hold the plates aligned and spaced.

Figs. 6 and 7 illustrate a T-shaped multiple turn inductor also embodying the present invention and comprising a plurality of spaced parallel plates 53, 54 which form the cross portion of the T. The plates are each secured to spacing blocks 31 disposed therebetween for rigidly holding the plates aligned and spaced. Each plate has a row of work receiving apertures 55 or 56, with the apertures 55 axially aligned with the apertures 56. Cuts or gaps 14 in each of the plates join the row of apertures together. A transverse slot 57 extends from the periphery of each plate, intermediate the ends of the plate, and bisects a gap 14 between a pair of adjacent apertures in each plate. Each plate forms a single turn conductor beginning on one side of transverse slot 57 and ending on the other side of the slot. Cooling means for the plates comprises rectangular copper tubes 58 secured to the periphery of plate 54. Ends of tubes 58 and 59 are joined together between the plates by another piece of copper tube 60 which connects the tubes hydraulically in series and connects the plates 53, 54 electrically in series. The other ends of the tubes connect with ducts 61, 62 in bus bars 63, 64 which are each suitably secured to one of the plates on opposite sides of the transverse slot.

Suitable means such as adapters 65 mounted in the bus bars and connected with the ducts 61, 62 therein provide a connection for circulating cooling fluid (not shown) through the cooling conduits.

Although but a few embodiments of the present invention have been shown and described, it will be understood that changes and modifications may be made therein without departing from the spirit of the invention or from the scope of the appended claims.

It is claimed and desired to secure by Letters Patent:

1. A multiple turn inductor for high frequency induction heating of a work piece, said inductor comprising superposed parallel plates each forming a conductor turn of said inductor, each of said plates having work receiving apertures, a slot in each said plate extending from one of said apertures to the periphery of the plate, a first said plate including a first metal conduit for the passage of cooling fluid therethrough, said first conduit being secured to the first said plate, a second said plate including a second metal conduit for the passage of cooling fluid therethrough, said second conduit being secured to the second said plate, and a third conduit disposed between said first and second plates, said third conduit joining said first and second conduits and serving as the only means connecting said conduits in hydraulical series relation and serving as the only means connecting said plates in electrical series relation.

2. A two turn inductor for high frequency induction heating of a plurality of work pieces, said inductor comprising a first metal plate having a row of work receiving apertures therein, said first plate having gaps joining said apertures, a slot in said first plate extending from one of said apertures to the periphery of said first plate to cause said first plate to form a conductor turn, a first metal cooling conduit extending around the periphery of said first plate, a second metal plate similar to said first metal plate forming a second conductor turn with a second metal cooling conduit extending around its periphery, said plates being parallel with the work receiving apertures axially aligned, a third conduit joining an end of said first cooling conduit to an end of said second cooling conduit between said plates and adjacent said slot, said third conduit serving as the only means connecting said cooling conduits hydraulically in series and serving as the only means connecting said conductor turns formed by said plates electrically in series, the other two ends of said cooling conduits being lead conductors for said two turn inductor.

3. A two turn inductor for high frequency induction heating of a plurality of work pieces, said inductor comprising a first metal plate having a row of work receiving apertures therein, said first plate having gaps joining said apertures, a transverse slot intermediate the ends of said first plate extending from one of said gaps to the periphery of said first plate to cause said first plate to form a conductor turn, a metal cooling conduit extending around the periphery of said first plate, another metal plate similar to said first metal plate forming a second conductor turn with a metal cooling conduit extending around its periphery, said plates being parallel with the work receiving apertures axially aligned, an end of one said cooling conduit being connected to an end of the other said cooling conduit between said plates and adjacent said transverse slots for serving as the only means connecting said cooling conduits hydraulically in series and serving as the only means connecting said conductor turns formed by said plates electrically in series.

4. A multiple turn inductor for high frequency induction heating of a plurality of work pieces, said inductor being substantially T-shaped and comprising a plurality of spaced parallel plates forming the cross portion of the T, said plates having a row of axially aligned work receiving apertures, gaps joining said apertures in each said plate, a transverse slot in each said plate extending from one of said gaps to the periphery of the plate to cause each said plate to form a conductor turn, each said plate having a metal cooling conduit which extends around the periphery of the plate from one side of the transverse slot to the other, one end of said cooling conduit for one of said plates being joined to one end of said cooling conduit for another of said plates, said junction of said cooling conduits being the only means connecting said cooling conduits in hydraulically series relation and being the only means connecting the conductor turns formed by said plates in electrical series relation.

5. A multiple turn inductor for high frequency induction heating of a work piece, said inductor comprising superposed parallel plates, each of said plates having work receiving apertures and gaps joining said apertures, a slot in each said plate extending to the periphery thereof and cooperating with said apertures and said gaps to form a conductor turn of said inductor, a first said plate including a first metal conduit for the passage of cooling fluid therethrough, said first conduit being secured to said first plate, a second said plate including a second metal conduit for the passage of cooling fluid therethrough, said second conduit being secured to the second said plate, and a third conduit disposed between said first and second plates, said third conduit joining said first and second conduits and serving as the only means connecting said conduits in hydraulical series relation and serving as the only means connecting said plates in electrical series relation.

References Cited in the file of this patent

UNITED STATES PATENTS

| | | |
|---|---|---|
| 2,271,916 | Denneen et al. | Feb. 3, 1942 |
| 2,353,130 | Dravneek | July 11, 1944 |
| 2,459,971 | Stanton | Jan. 25, 1949 |
| 2,471,471 | Wood | May 31, 1949 |
| 2,481,008 | Gagliardi | Sept. 6, 1949 |